April 13, 1943.  H. C. TRYON  2,316,729
TANK FOR USE IN AIRCRAFT
Filed May 12, 1942
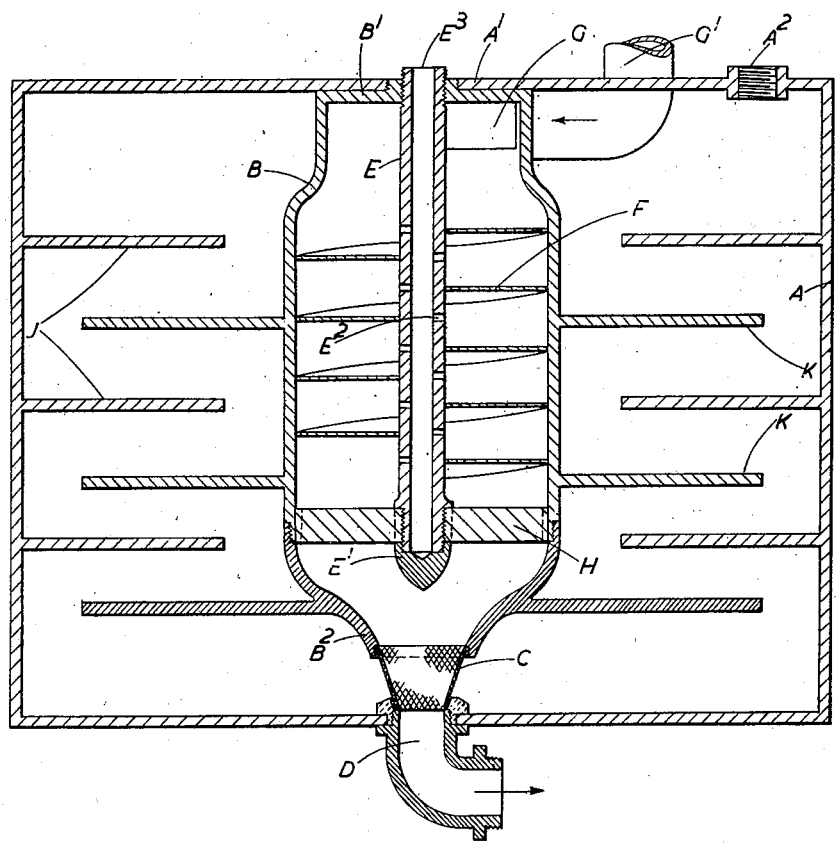
INVENTOR
H. C. TRYON.
BY
ATTORNEYS.

Patented Apr. 13, 1943

2,316,729

UNITED STATES PATENT OFFICE 2,316,729

TANK FOR USE IN AIRCRAFT

Henry Christopher Tryon, London, England, assignor to D. Napier & Son Limited, London, England, a company of Great Britain Application May 12, 1942, Serial No. 442,687
In Great Britain June 30, 1941

6 Claims. (Cl. 137—21)

This invention relates to tanks for use in aircraft and in particular to tanks containing liquid such as lubricating oil supplied by a pump to the engine or to auxiliary apparatus which is hydraulically operated. The object of the invention is to provide a tank from which a continuous supply can be maintained irrespective of temporary interference which is apt to arise owing to sudden movements of the aircraft.

According to this invention the improved tank comprises in combination an outer chamber within which is fixed and extends vertically an inner chamber having at its upper end an inlet through which liquid is delivered into the chamber, a baffle in this inner chamber which tends to impart a swirling motion to the entering liquid and constrains it to follow a helical path downwards as it passes through the chamber, vanes in the lower part of the inner chamber which tend to straighten the direction of liquid flow to an outlet at the lower end of that chamber, and a passage which leads from the lower end of the inner chamber to the main delivery pipe for the liquid and with which passage the lower part of the outer chamber communicates. The baffle in the inner chamber, and preferably also the straightening vanes are carried on a central shaft fixed vertically in that chamber. This shaft may be hollow with its lower end which lies within the inner chamber closed and its upper end open directly or indirectly to the atmosphere, holes being formed in the wall of the shaft to permit escape of air from the liquid in the chamber. In the space in the outer chamber between its side walls and the wall of the inner chamber there extend from these walls respectively horizontal baffles which alternate and overlap with spaces between them. These baffles prevent sudden movement of the whole contents of the outer tank from the lower to the upper part when sudden movements of the aircraft occur.

The passage between the main liquid delivery pipe from the tank and the lower end of the inner chamber has openings in its wall through which liquid can pass from the outer chamber into this passage. Straining material is disposed over these openings, or the wall of the passage may be formed wholly or in part of straining material such as wire gauze.

The shape and dimensions of the main or outer tank may vary as for instance in accordance with the position of the tank on the aircraft and with the space available. The invention is particularly applicable to a tank from which lubricating oil is supplied to the engine and in such cases the oil circulated by the pump is made to pass through the inner cylindrical chamber whilst the oil in the main tank, which may have a separate inlet, is used to make up losses due to any cause and in particular the oil which is consumed in the engine.

The accompanying drawing shows in sectional elevation and by way of example a construction of the improved tank.

Within an outer tank or chamber A of suitable shape and construction there is fixed a cylindrical chamber B which is positioned preferably about the centre of the outer chamber A. Conveniently the closed upper end $B^1$ of the inner chamber is attached to the upper side $A^1$ of the outer or main tank from which the inner cylindrical chamber extends vertically downwards. At its lower end the diameter of the inner chamber is reduced as at $B^2$ to a central opening which is connected by a passage C formed as shown of wire gauze or the like permeable material, to the main outlet D from the tank. Disposed centrally in the inner chamber B is a hollow shaft E on which is carried a helical baffle F whose peripheral edge lies against the inner wall of the chamber B. This baffle forms a helical path for the liquid which it must follow as it passes downwards in the chamber from an inlet G, which enters the upper end of the chamber tangentially, to the outlet passage C at the bottom of the chamber. The pipe $G^1$ through which the liquid is delivered to the inlet G passes through the upper side $A^1$ of the outer tank. Conveniently there is a separate inlet $A^2$ through which liquid can be caused to flow directly into the outer chamber A.

The lower and inner end of the shaft E is closed as by a cap $E^1$ and lies near the lower end $B^2$ of the inner chamber B and on this end part of the shaft is carried a set of radial vanes H which extend to the wall of the chamber B. These vanes H which are in effect flat narrow plates tend to straighten the direction of the liquid flow after passing along the helical path over the baffle F as it travels to the outlet passage C. Conveniently holes $E^2$ are formed through the wall of the shaft E through which air which may be in the liquid around the shaft can pass into the shaft and thence directly to the atmosphere by way of the open upper end $E^3$ of the shaft. Alternatively, since some oil may be carried off with the air, this may be led from the shaft E to the engine sump.

In the space in the outer chamber A between its wall and the inner chamber B there are arranged a series of horizontal baffles J and K, the baffles J extending from the wall of the outer chamber towards the inner chamber, and the baffles K extending from the outer wall of the chamber B towards the wall of the outer chamber. As will be seen these baffles alternate with spaces between them and their object is to prevent the sudden transference of liquid from the lower to the upper part of the outer chamber A on occasions when sudden movements of the aircraft would tend to cause such transference.

Owing to the helical baffle F and to the tangential delivery of liquid into the cylinder B the incoming oil or other liquid has a swirling motion imparted to it and is thrown against the wall of the cylinder. If air vents $E^2$ are provided as above described they tend to prevent air from being carried into the pump, but primarily the swirling motion is intended to counteract any tendency for the supply of oil to be interrupted should sudden movements of the aircraft occur. In any event the helical baffle F will prevent any sudden transfer of the oil from the lower part of the chamber B and hence from the outlet D from the lower end of the tank to the pump.

In addition, as the main or outer tank A is provided with horizontally extending baffles J, K, which prevent the oil from being thrown upwards and since the lower end of the chamber A is in permanent communication with the outlet D to the pump through the strainer or ports in the wall of the passage C, the supply of oil to the pump will be maintained and any losses due to consumption of oil by the engine or otherwise are continuously made good by the delivery through the opening $A^2$ into the chamber A.

Although the invention has been described with particular reference to the oil supplied to an aircraft engine, it will be understood that a similar tank may be used for supplying liquid to any auxiliary apparatus or appliances on the aircraft which are operated hydraulically.

What I claim as my invention and desire to secure by Letters Patent is:

1. In a tank for liquid for use on aircraft the combination of an outer chamber, an inlet through which liquid can enter the upper part of this chamber, an inner cylindrical chamber which is fixed and extends vertically within the outer chamber, an inlet through which liquid is delivered into the upper end of the inner chamber, a helical baffle in the inner chamber which tends to impart a swirling motion to the liquid and constrains it to follow a helical path downwards as it passes through the chamber, vanes in the lower part of the inner chamber which there tend to straighten the direction of liquid flow to an outlet at the lower end of that chamber, a main outlet and a delivery pipe leading from the tank, and a passage between the lower end of the inner chamber and the said main outlet with which passage the lower part of the outer chamber communicates.

2. In a tank for liquid for use on aircraft the combination of an outer chamber, an inlet through which liquid can enter the upper part of this chamber, an inner cylindrical chamber which is fixed and extends vertically within the outer chamber, an inlet through which liquid is delivered into the upper end of the inner chamber, a hollow shaft carried by the upper end of the inner chamber and extending downwards in the centre of and towards the lower part of that chamber, this shaft having perforations in its wall and its upper end in communication with the atmosphere, a helical baffle in the inner chamber which lies around and is carried by the central shaft extending between that shaft and the wall of that chamber, this baffle tending to impart a swirling motion to the liquid and constraining it to follow a helical path downwards as it passes through the inner chamber, vanes in the lower part of the inner chamber which there tend to straighten the direction of liquid flow to an outlet at the lower end of that chamber, a main outlet and a delivery pipe leading from the tank, and a passage between the lower end of the inner chamber and the said main outlet with which passage the lower part of the outer chamber communicates.

3. In a tank for liquid for use on aircraft the combination of an outer chamber, an inlet through which liquid can enter the upper part of this chamber, an inner cylindrical chamber which is fixed and extends vertically within the outer chamber, an inlet through which liquid is delivered into the upper end of the inner chamber, a helical baffle in the inner chamber which tends to impart a swirling motion to the liquid and constrains it to follow a helical path downwards as it passes through the chamber, vanes in the lower part of the inner chamber which there tend to straighten the direction of liquid flow to an outlet at the lower end of that chamber, baffles in the outer chamber respectively carried by and extending horizontally from the wall of the outer chamber and the wall of the inner chamber and disposed so as to alternate, a main outlet and a delivery pipe leading from the tank, and a passage between the lower end of the inner chamber and the said main outlet with which passage the lower part of the outer chamber communicates.

4. In a tank for liquid for use on aircraft the combination of an outer chamber, an inlet through which liquid can enter the upper part of this chamber, an inner cylindrical chamber which is fixed and extends vertically within the outer chamber, an inlet through which liquid is delivered into the upper end of the inner chamber, a helical baffle in the inner chamber which tends to impart a swirling motion to the liquid and constrains it to follow a helical path downwards as it passes through the chamber, vanes in the lower part of the inner chamber which there tend to straighten the direction of liquid flow to an outlet at the lower end of that chamber, a main outlet and a delivery pipe leading from the tank, a passage between the lower end of the inner chamber and the said main outlet with which passage the lower part of the outer chamber communicates, and straining material disposed where liquid must pass through it as it flows from the outer chamber to the main outlet.

5. In a tank for liquid for use on aircraft the combination of an outer chamber, an inlet through which liquid can enter the upper part of this chamber, an inner cylindrical chamber which is fixed and extends vertically within the outer chamber, an inlet through which liquid is delivered into the upper end of the inner chamber, a hollow shaft carried by the upper end of the inner chamber and extending downwards in the centre of and towards the lower part of that chamber, this shaft having perforations in its wall and its upper end in communication with the atmosphere, a helical baffle in the inner chamber which lies around and is carried by the central shaft extending between that shaft and the wall of that chamber, this baffle tending to impart a swirling motion to the liquid and constraining it to follow a helical path downwards as it passes through the inner chamber, vanes in the lower part of the inner chamber which there tend to straighten the direction of liquid flow to an outlet at the lower end of that chamber, baffles in the outer chamber respectively carried by and extending horizontally from the wall of the outer chamber and the wall of the inner chamber and disposed so as to alternate, a main outlet and a delivery pipe leading from the tank, and a passage between the lower end of the inner chamber and the said main outlet with which passage the lower part of the outer chamber communicates.

6. In a tank for liquid for use on aircraft the combination of an outer chamber, an inlet through which liquid can enter the upper part of this chamber, an inner cylindrical chamber which is fixed and extends vertically within the outer chamber, an inlet through which liquid is delivered into the upper end of the inner chamber, a helical baffle in the inner chamber which tends to impart a swirling motion to the liquid and constrains it to follow a helical path downwards as it passes through the chamber, vanes in the lower part of the inner chamber which there tend to straighten the direction of liquid flow to an outlet at the lower end of that chamber, a main outlet and a delivery pipe leading from the tank, a passage between the lower end of the inner chamber and the said main outlet with which passage the lower part of the outer chamber communicates, and straining material which forms at least part of a wall for this passage and through which material liquid must pass as it flows from the outer chamber to the main outlet.

HENRY CHRISTOPHER TRYON.